United States Patent
Fasullo et al.

[11] Patent Number: 6,078,511
[45] Date of Patent: Jun. 20, 2000

[54] TEMPERATURE PROTECTION CIRCUIT FOR POWER CONVERTER AND METHOD OF OPERATION THEREOF

[75] Inventors: Greg H. Fasullo, Dallas; Jin He, Plano; Greg P. Jorgenson, Quinlan; Nhon D. Le, Rowlett, all of Tex.

[73] Assignee: Lucent Technologies, Inc., Murray Hill, N.J.

[21] Appl. No.: 09/203,444

[22] Filed: Dec. 1, 1998

[51] Int. Cl.[7] .................................................. H02H 7/10
[52] U.S. Cl. .................................................. 363/50
[58] Field of Search .............................. 363/50; 361/103, 361/106, 27

[56] References Cited

U.S. PATENT DOCUMENTS

| | | | |
|---|---|---|---|
| 4,636,910 | 1/1987 | Chadwick | 361/103 |
| 4,887,181 | 12/1989 | Lenz | 361/103 |
| 5,585,995 | 12/1996 | Baurand et al. | 361/103 |
| 5,640,293 | 6/1997 | Dawes et al. | 361/93 |
| 5,763,929 | 6/1998 | Iwata | 257/467 |
| 5,805,403 | 9/1998 | Chemla | 361/103 |

*Primary Examiner*—Adolf Deneke Berhane

[57] ABSTRACT

A temperature protection circuit, a method of protecting a power converter and a power converter employing the circuit or the method. In one embodiment, the circuit includes: (1) a temperature sensor, located in thermal communication with the power converter, that produces a signal based on a temperature associated with the power converter and (2) a current controller, coupled to the temperature sensor, that reduces an output current of the power converter to an intermediate level based on the signal.

20 Claims, 3 Drawing Sheets

6,078,511

TEMPERATURE PROTECTION CIRCUIT FOR POWER CONVERTER AND METHOD OF OPERATION THEREOF

TECHNICAL FIELD OF THE INVENTION

The present invention is directed, in general, to protection for power conversion circuitry and, more specifically, to a temperature protection circuit for a power converter and a method of operating the same.

BACKGROUND OF THE INVENTION

The earliest power converters operated until they exceeded the physical tolerances of their components, causing them to run the risk of catastrophic failure. In response to this patent deficiency, designers added current protection circuitry to prevent the power converters from exceeding a predetermined full rated output current. Even with current protection in place, excessive operating temperatures (typically caused by ambient environmental factors) still damaged the power converters.

In response to this further deficiency, designers provided thermal protection circuitry that sensed the temperature of the hottest component of the system and completely shut down the power converter when the sensed operating temperature exceeded a specified value. Until the specified value was exceeded, the power converters operated at their maximum output current level. Unfortunately, any load, regardless of size, suffered sudden power loss. What is needed in the art is a way to prevent unnecessary shutdown of power converters under excess temperature conditions.

SUMMARY OF THE INVENTION

To address the above-discussed deficiencies of the prior art, the present invention provides a temperature protection circuit, a method of protecting a power converter and a power converter employing the circuit or the method. In one embodiment, the circuit includes: (1) a temperature sensor, located in thermal communication with the power converter, that produces a signal based on a temperature associated with the power converter and (2) a current controller, coupled to the temperature sensor, that reduces an output current of the power converter to an intermediate level based on the signal.

The present invention is based on the fundamental recognition that, when the load attached to a power converter requires less than the converter's full rated output current, the converter's output current can be decreased (in effect "de-rating" the converter) at elevated temperatures to extend the converter's operating range. "De-rating" avoids having to shut the converter completely down. For purposes of the present invention, "intermediate level" is defined as a level of output current less than full rating but more than an incidental leakage current that may continue to flow through the converter (and certainly more than zero current).

In one embodiment of the present invention, the current controller linearly reduces the output current as a function of the signal. Of course, other functions or relations are fully within the broad scope of the present invention.

In one embodiment of the present invention, the current controller further reduces the output current to zero when the signal attains a predetermined value. Though optional, the present invention contemplates embodiments in which the converter is completely shut down when its temperature becomes sufficiently elevated.

In one embodiment of the present invention, the temperature sensor is located proximate a power switch in the power converter. In a more specific embodiment of the present invention, the temperature sensor is coupled to a heat sink associated with a power switch in the power converter. Of course, the temperature sensor may be located in any place within or proximate the converter.

In one embodiment of the present invention, the temperature sensor is a thermistor. Those skilled in the pertinent art will perceive, however, that other conventional or later-developed temperature sensors fall within the broad scope of the present invention.

In one embodiment of the present invention, the current controller is embodied as a sequence of instructions executable in a microcontroller associated with the power converter. Alternatively, the current controller may be embodied in discrete or integrated, digital or analog hardware or firmware.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
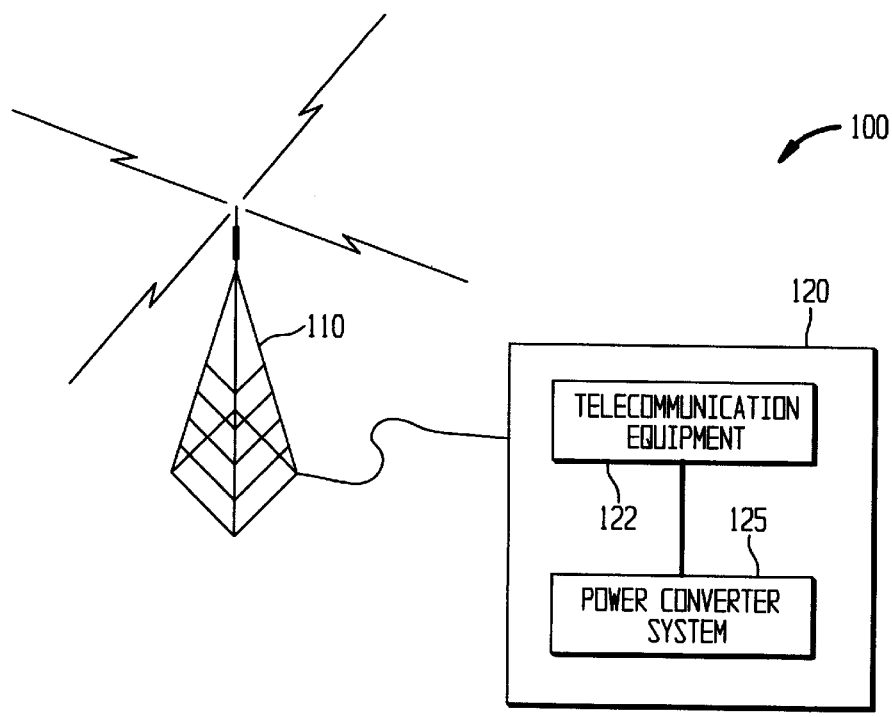
FIG. 1 illustrates a block diagram of one embodiment of a system containing a power converter having a temperature protection circuit constructed according to the principles of the present invention.

Referring initially to FIG. 1, illustrated is a block diagram of one embodiment of a system, generally designated 100, containing a power converter having a temperature protection circuit constructed according to the principles of the present invention. The system 100 comprises a telecommunication tower 110 connected to a telecommunication equipment housing container 120. Contained within the telecommunication equipment housing container 120 are various pieces of telecommunication equipment 122 and a power converter system 125.

The power converter system 125 supplies power to the telecommunication equipment 122. The telecommunication equipment 122 transmits and receives information through the telecommunication tower 110. In one embodiment of the present invention, the power converter system 125 operates at 100% of rated output current capacity until the power converter system's operating temperature reaches a specific operating temperature value. However, the telecommunication equipment 122 requires less than the power converter system's full rated output current. Once the specific operating temperature value is reached, the power converter system 125 decreases its output current ("de-rates") to extend the power converter system's operating range to above the maximum temperature at its full rated output current.

Figure 2:
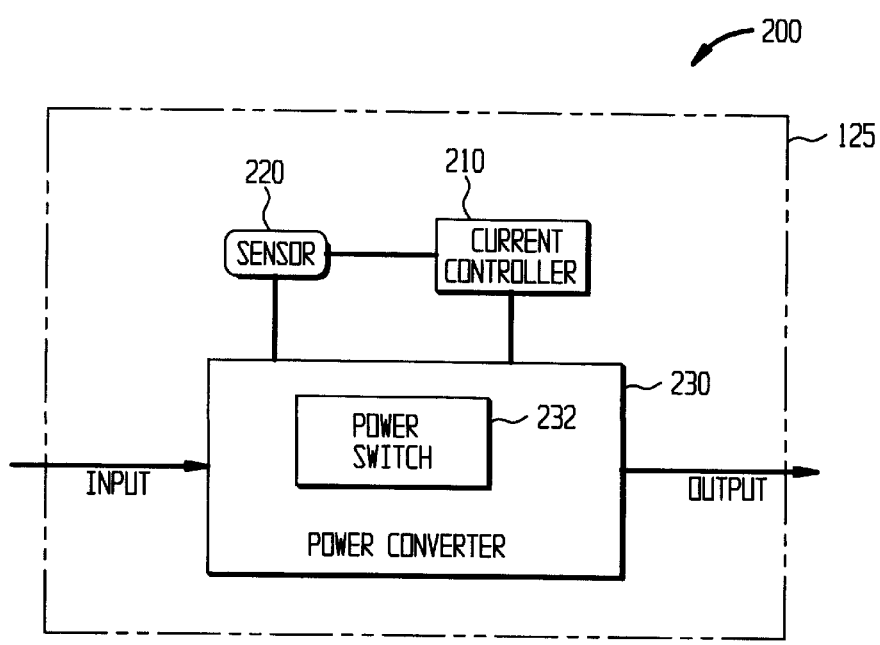
FIG. 2 illustrates a block diagram of the system of FIG. 1 in greater detail.

Turning now to FIG. 2, illustrated is a block diagram of the power converter system 125 of FIG. 1 in greater detail. The power converter system 125 of FIG. 1 comprises three major components: a power converter 230, a temperature sensor 220 and a current controller 210. The power converter 230 converts the input power into regulated output power. Contained within the power converter 230 is a power switch 232. In another embodiment of the present invention, the power converter 230 comprises a plurality of power switches 232.

The second major component is the temperature sensor 220. The temperature sensor 220 produces a signal that is based on the temperature associated with the power converter 230. In one embodiment of the present invention, the temperature sensor 220 is located in thermal communication with the power converter 230. More specifically, the temperature sensor 220 is located proximate the power switch 232 in the power converter 230. The temperature sensor 220 may be coupled to a heat sink associated with the power switch 232 in the power converter 230. In the illustrated embodiment, the temperature sensor 220 is a thermistor. In another embodiment of the present invention, a plurality of temperature sensors 220 are located in thermal communication with the power converter 230.

The third major component is the current controller 210. The current controller 210 is coupled to the temperature sensor 220 and reduces or increases the output current of the power converter 230 based upon the signal of the temperature sensor 220. In the illustrated embodiment of the present invention, the current controller 210 linearly reduces the output current of the power converter 230, although nonlinear reduction is within the scope of the present invention. In the illustrated embodiment of the present invention, the current controller 210 further reduces the power converter's 230 output current to zero when the temperature sensor 220 generates a signal of a predetermined value, although some embodiments of the present invention do not provide for sudden shutdown.

In the illustrated embodiment of the present invention, the method and system of the current controller 210 are embodied as a sequence of instructions executable in a microcontroller (not shown) associated with the power converter 230. Those skilled in the pertinent art are familiar with the use of microcontrollers to control power converters.

The present invention reduces the output current of the power converter 230 to reduce the amount of heat generated by the power converter system 125. With less heat being generated, the power converter 230 can continue supplying current to the telecommunication equipment 122 as the ambient temperature continues to increase. Thus, the present invention allows the power convert 230 to operation over a wider temperature range to meet power requirements in diverse temperature environments.

Background information concerning power converters and current controllers is discussed in *Power Electronics: Converters, Applications and Design* by Ned Mohan, et al., John Wiley & Sons 1989. The foregoing publication is incorporated herein by reference.

Figure 3:
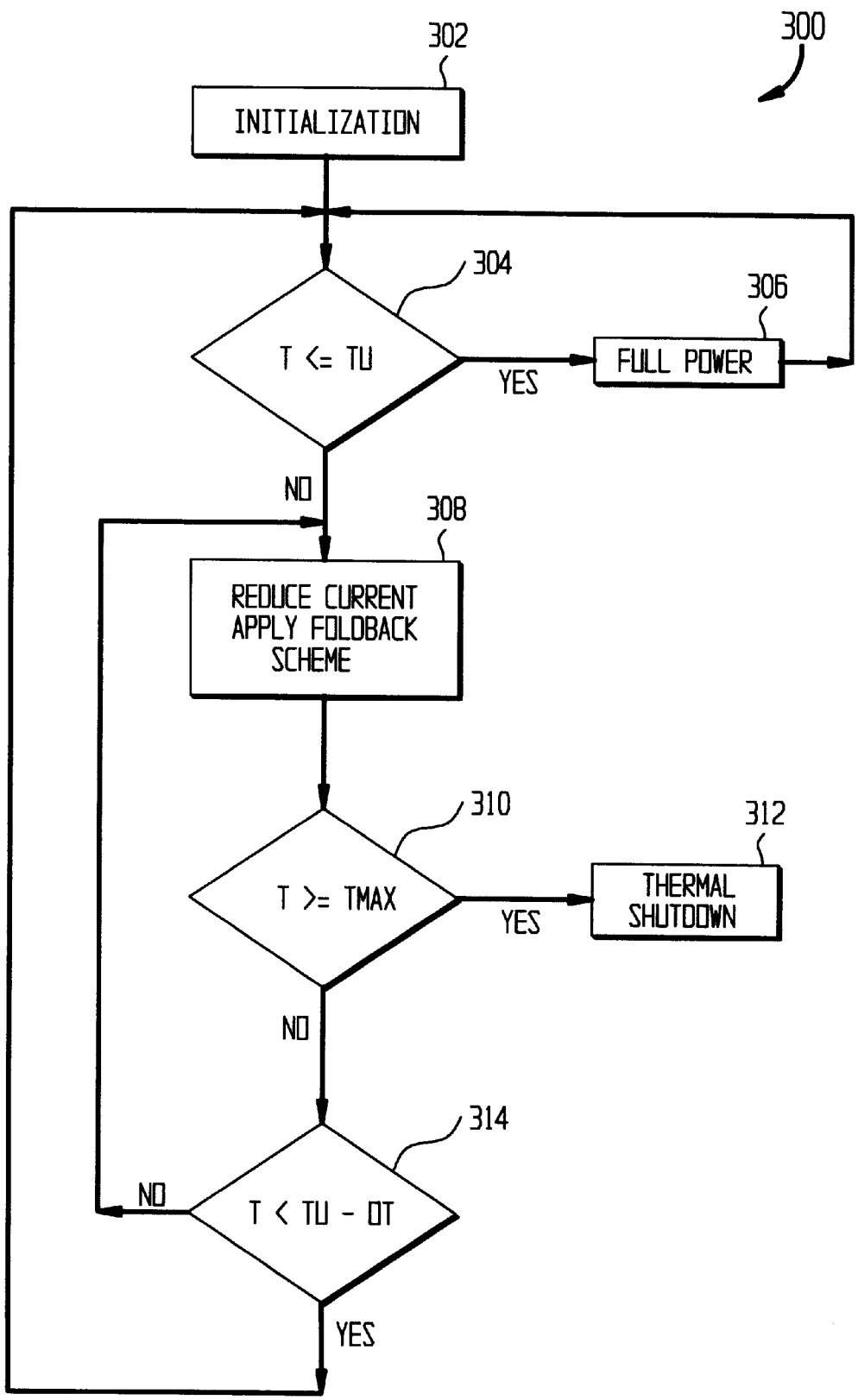
FIG. 3 illustrates a flow diagram of a method of extending the operating range of a power converter by reducing the power converter's output current.

Turning now to FIG. 3, illustrated is a flow diagram of a method of extending the operating range of a power converter by reducing the power converter's output current. In FIG. 3, the current controller 210 first performs initialization (in a step 302).

After initialization, the current controller 210 checks if the power converter's 230 actual temperature ("T") is less than or equal to the operating temperature upper limit ("TU") (in a decisional step 304). If the actual temperature is within limits, the current controller 210 controls the power converter 230 to full power (in a step 306). The current controller 210 then checks if the actual temperature is still within limits (in the decisional step 304).

If the actual temperature is not within limits, then current controller 210 reduces the output current by applying a foldback scheme (in a step 308). The foldback scheme calls for the output current to be reduced to decrease the heat dissipated by the power converter 230. By the decreasing the heat generated, the power converter 230 can continue to operate safely at higher ambient temperatures.

In one embodiment of the present invention, the foldback scheme comprises a linear function. The linear function is:

$$I_n = I_{max} - (T-TU)*K.$$

Where $I_n$ is the new output current, $I_{max}$ is the maximum output current, T is actual temperature, TU is the operating temperature upper limit and K is a current foldback slope. An example of the current foldback slope is 3A/° C. Those skilled in the art should appreciate that they can readily use different foldback schemes and foldback slopes for carrying out the same purposes of the present invention.

After applying the foldback scheme, the current controller 210 checks if the actual temperature ("T") has reached or exceeded the power converter's thermal shutdown value ("TMAX") (in a decisional step 310). If the actual temperature is at or above the thermal shutdown value, then the current controller 210 shuts down the power converter 230 (in a step 312).

If the actual temperature is not at the thermal shutdown value, then the current controller 210 checks if the actual temperature ("T") is below the operating temperature upper limit ("TU") less some offset temperature factor ("OT") (in a decisional step 314). The present invention uses the offset temperature factor (hysteresis) to prevent the power converter 230 from oscillating.

If the actual temperature is not below the desired temperature value, then the current controller 210 applies the foldback scheme (in the step 308). If the actual temperature is below the desired temperature value, the current controller 210 returns to check if full power can be restored (in the decisional step 304).

Those skilled in the art should note that the temperature of the power converter 230 is also a function of the ambient temperature. The relationship between ambient temperature and power converter temperature is not necessarily linear. Also, those skilled in the art should appreciate that method or steps of the method of the present invention may be applied at various different time intervals.

Figure 4:
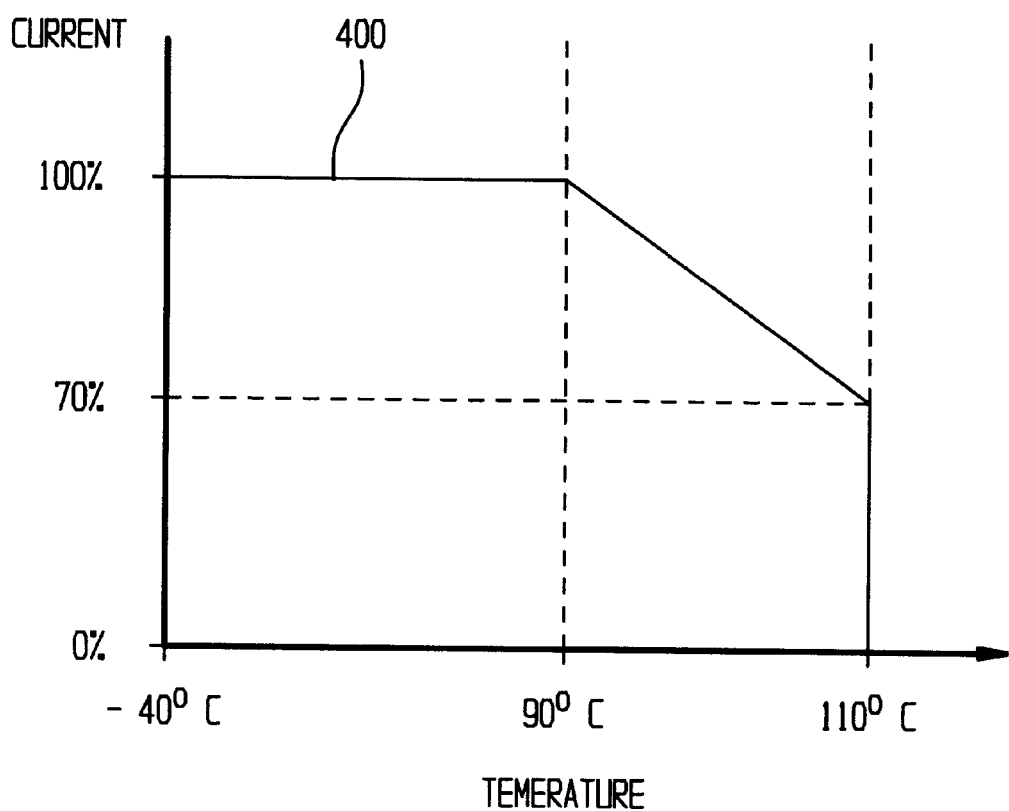
FIG. 4 illustrates a graphical representation of a temperature-dependent current curve for one embodiment of the present invention.

Turning now to FIG. 4, illustrated is a temperature dependent current curve 400 for one embodiment of the present invention. In FIG. 4, the power converter system 125 operates at 100% of its rated output current. Once the temperature reaches 90° C., the power converter system 125 reduces the output current as the temperature increases. Upon reaching the thermal shutdown temperature, for example 110° C., the power converter system 125 completely shuts down to prevent damage. When the power converter system 125 is in thermal shutdown, the power converter system 125 has zero output current. However, it should be understood that the present invention is not limited to any particular temperature-to-current relationship. Also, the present invention is not limited to the values shown.

From the above, it is apparent that the present invention provides a temperature protection circuit, a method of protecting a power converter and a power converter employing the circuit or the method. In one embodiment, the circuit includes: (1) a temperature sensor, located in thermal communication with the power converter, that produces a signal based on a temperature associated with the power converter and (2) a current controller, coupled to the temperature sensor, that reduces an output current of the power converter to an intermediate level based on the signal.

Although the present invention has been described in detail, those skilled in the art should understand that they can make various changes, substitutions and alterations herein without departing from the spirit and scope of the invention in its broadest form.

What is claimed is:

1. For use with a power converter, a temperature protection circuit, comprising:

a temperature sensor, located in thermal communication with said power converter, that produces a signal based on a temperature associated with said power converter; and a current controller, coupled to said temperature sensor, that reduces an output current of said power converter to an intermediate level based on said signal and a temperature-dependent output capacity of said power converter.

2. The circuit as recited in claim 1 wherein said current controller linearly reduces said output current as a function of said signal.

3. The circuit as recited in claim 1 wherein said current controller further reduces said output current to zero when said signal attains a predetermined value.

4. The circuit as recited in claim 1 wherein said temperature sensor is located proximate a power switch in said power converter.

5. The circuit as recited in claim 1 wherein said temperature sensor is coupled to a heat sink associated with a power switch in said power converter.

6. The circuit as recited in claim 1 wherein said temperature sensor is a thermistor.

7. The circuit as recited in claim 1 wherein said current controller is embodied as a sequence of instructions executable in a microcontroller associated with said power converter.

8. A method of providing temperature protection to a power converter, comprising:

producing a signal based on a temperature associated with said power converter; and reducing an output current of said power converter to an intermediate level based on said signal and a temperature-dependent output capacity of said power converter.

9. The method as recited in claim 8 wherein said reducing comprises linearly reducing said output current as a function of said signal.

10. The method as recited in claim 8 wherein said reducing comprises further reducing said output current to zero when said signal attains a predetermined value.

11. The method as recited in claim 8 wherein said producing comprises sensing said temperature with a temperature sensor located proximate a power switch in said power converter.

12. The method as recited in claim 8 wherein said producing comprises sensing said temperature with a temperature sensor coupled to a heat sink associated with a power switch in said power converter.

13. The method as recited in claim 8 wherein said producing comprises sensing said temperature with a thermistor.

14. The method as recited in claim 8 wherein said reducing comprises executing a sequence of instructions executable in a microcontroller associated with said power converter.

15. A power converter, comprising:

a power switch;

a converter controller that toggles said power switch to control an output current of said power converter; and a temperature protection circuit associated with said converter controller and including:

a temperature sensor, located in thermal communication with said power switch, that produces a signal based on a temperature associated with said power switch, and a current controller, coupled to said temperature sensor, that reduces said output current to an intermediate level based on said signal and a temperature-dependent output capacity of said power converter.

16. The converter as recited in claim 15 wherein said current controller linearly reduces said output current as a function of said signal.

17. The converter as recited in claim 15 wherein said current controller further reduces said output current to zero when said signal attains a predetermined value.

18. The converter as recited in claim 15 wherein said temperature sensor is coupled to a heat sink associated with said power switch.

19. The converter as recited in claim 15 wherein said temperature sensor is a thermistor.

20. The converter as recited in claim 15 wherein said current controller is embodied as a sequence of instructions executable in a microcontroller associated with said power converter.

\* \* \* \* \*